US012164189B2

(12) United States Patent
Uchida et al.

(10) Patent No.: US 12,164,189 B2
(45) Date of Patent: Dec. 10, 2024

(54) LIQUID CRYSTAL PANEL AND LIQUID CRYSTAL DISPLAY DEVICE

(71) Applicant: Sharp Display Technology Corporation, Kameyama (JP)

(72) Inventors: Seiichi Uchida, Kameyama (JP); Kuniaki Okada, Kameyama (JP); Keisuke Yoshida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/233,537

(22) Filed: Aug. 14, 2023

(65) Prior Publication Data

US 2024/0103311 A1    Mar. 28, 2024

(30) Foreign Application Priority Data

Sep. 26, 2022    (JP) ................................ 2022-152256

(51) Int. Cl.
*G02F 1/1335*    (2006.01)
*G02F 1/1339*    (2006.01)

(52) U.S. Cl.
CPC ...... *G02F 1/133512* (2013.01); *G02F 1/1339* (2013.01)

(58) Field of Classification Search
CPC .............. G02F 1/1339; G02F 1/13392; G02F 1/13394; G02F 1/13396; G02F 1/13398; G02F 1/133512; G02F 1/136209
USPC .................. 349/106, 110, 155, 156
See application file for complete search history.

(56) References Cited

U.S. PATENT DOCUMENTS

2016/0187717 A1*   6/2016   Hosokawa ........ G02F 1/134309
                                                                          349/110

FOREIGN PATENT DOCUMENTS

CN          104020605 A   *  9/2014
JP          2016-122175 A    7/2016

OTHER PUBLICATIONS

Espacenet English machine translation of CN104020605A (Year: 2014).*

* cited by examiner

*Primary Examiner* — Dung T Nguyen
*Assistant Examiner* — David Y Chung
(74) *Attorney, Agent, or Firm* — ScienBiziP, P.C.

(57) ABSTRACT

Provided are a liquid crystal panel which has good visibility and in which a decrease in the display quality is sufficiently suppressed, and a head mounted display and a liquid crystal display device using the same. The liquid crystal panel includes a liquid crystal layer, a spacer, and a light-shielding section between a first substrate a second substrate facing the first substrate. The light-shielding section includes column-direction light-shielding sections arranged in a column direction and shielding parts between the pixels aligned in a row direction from light, and row-direction light-shielding sections arranged in the row direction and shielding parts between the pixels aligned in the column direction from light. The row-direction light-shielding sections include one that includes a first light-shielding section including an arrangement region of the spacer and a second light-shielding section adjacent to the first light-shielding section in the column direction.

16 Claims, 12 Drawing Sheets

LIQUID CRYSTAL PANEL AND LIQUID CRYSTAL DISPLAY DEVICE

CROSS-REFERENCE TO RELATED APPLICATIONS

The present application claims priority under 35 U.S.C. § 119 to Japanese Patent Application No. 2022-152256 filed on Sep. 26, 2022, the contents of which are incorporated herein by reference in their entirety.

BACKGROUND OF THE INVENTION

Field of the Invention

The following disclosure relates to a liquid crystal panel and a liquid crystal display device.

Description of Related Art

A liquid crystal panel as a main component of a liquid crystal display device generally has a configuration including a liquid crystal layer sealed between a pair of substrates. In the liquid crystal panel, the light transmission amount is controlled by applying a voltage to the liquid crystal layer and changing the alignment state of liquid crystal molecules according to the applied voltage. Such a liquid crystal panel has been widely used in various applications, taking advantages of a thin profile, light weight, and low power consumption.

The liquid crystal panel is usually provided with cylindrical spacers (also referred to as photo spacers or spacers) to control the thickness (also referred to as a cell gap) of the liquid crystal layer. In the vicinity of the spacers, the liquid crystal molecules are aligned in a direction different from a desired alignment direction, causing light leakage. To prevent this, light-shielding sections are arranged to overlap with the spacers. JP 2016-122175 A discloses a technique of adjusting the areas of aperture sections by arranging the light-shielding sections at positions overlapping with the spacers and further, narrowing the widths of some of the light-shielding sections.

FIG. 17 is a planar schematic view (conceptual view) of pixels of a conventional liquid crystal panel. The liquid crystal panel includes, between a pair of substrates the liquid crystal layer, a spacer 40R, light-shielding sections 510R shielding inter-pixel parts in the row direction from light, and light-shielding sections 520R shielding inter-pixel parts in the column direction from light (FIG. 17 does not illustrate the substrates and the liquid crystal layer). In usual, the light-shielding section (light-shielding section 5210R) provided in an arrangement region of the spacer 40R is provided in a relatively large size to suppress the light leakage accompanying the arrangement of the spacer. This considerably reduces the aperture ratios of the pixels (610R and the like) around the spacer, as compared with the aperture ratios of the other pixels. Therefore, when an image is displayed and viewed on the liquid crystal panel, only a section where the spacer 40R is arranged appears dark, so that the visibility is not good.

FIG. 18 is a planar schematic view of the pixels possessed by the liquid crystal display device described in JP 2016-122175 A. FIG. 18 illustrates the pixels in a simplified and conceptualized manner for ease of comparison with FIG. 17. Also in this device, the light-shielding section (light-shielding section 5210R) provided in the arrangement region of the spacer 40R is provided in a relatively large size. In JP 2016-122175 A, light-shielding sections 5220R, shielding the parts between the pixels 610R over or under (meaning the upper side and the lower side in the drawing) the spacer 40R and pixels 620R positioned over or under the respective pixels 610R and adjacent to the spacer 40R across the pixels 610R, are designed to have a width reduced in the vertical direction. This configuration is described to allow adjustment of the aperture ratios of the pixels 610R positioned above or below the spacer 40R. However, the aperture ratios are difficult to adjust, and the contrast ratio may decrease due to light leakage.

In applications such as televisions, smartphones, and tablets, a low-resolution liquid crystal panel with a pixel density of 1000 ppi or less is usually used. On the other hand, in devices with a very small distance from the eye of an observer to the liquid crystal panel, such as a head mounted display (also referred to as an HMD), a high-resolution liquid crystal panel with a pixel density of more than 1000 ppi is used. Examples of the pixels of the low-resolution liquid crystal panel and the high-resolution liquid crystal panel are illustrated in FIGS. 19 and 20, respectively.

FIG. 19 is a planar schematic view of pixels of a low-resolution liquid crystal panel 1L. FIG. 20 is a planar schematic view of pixels of a high-resolution liquid crystal panel 1H. For simplification, FIGS. 19 and 20 each illustrate only a color filter layer 60 (red color filters 60R, green color filters 60G, and blue color filters 60B), spacers 40, gate lines 71, and source lines 74. In the low-resolution liquid crystal panel 1L, the area (size) of a single pixel is larger than that of each spacer 40 as illustrated in FIG. 19. Therefore, the effect on the aperture ratios of the pixels 610 overlapping with the arrangement region of a spacer 40 is small, and thus the effect on the visibility is considered to be small. In contrast thereto, the high-resolution liquid crystal panel 1H has the area of a single pixel smaller than that in the low-resolution liquid crystal panel 1L as illustrated in FIG. 20. This relatively increases the effect on the aperture ratios of the pixels 610 overlapping with the arrangement region of a spacer 40. More specifically, in the high-resolution liquid crystal panel 1H, the size of the spacers 40 is not negligible with respect to the pixel size, and thus the aperture ratios of the pixels 610 overlapping with the region where a spacer 40 is arranged considerable decrease. Hence, when an image is displayed and viewed on the high-resolution liquid crystal panel 1H, only a part where a spacer 40 is arranged appears dark (this phenomenon is also referred to as a "screen door effect of high-resolution pixels"). Thus, the effect on the pixel aperture ratios caused by the spacers 40 poses a particularly noticeable problem in the high-resolution liquid crystal panel. Therefore, a technology capable of achieving good visibility even in the case of the high-resolution liquid crystal panel is required.

BRIEF SUMMARY OF THE INVENTION

The present invention has been made in view of the above-described circumstances. It is an object of the present invention to provide a liquid crystal panel which has good visibility and in which a decrease in the display quality is sufficiently suppressed, and a head mounted display and a liquid crystal display device using the same.

(1) One embodiment of the present invention is a liquid crystal panel with a plurality of pixels arranged in a matrix shape having a plurality of rows and a plurality of columns, the liquid crystal panel including: a first substrate; a second substrate facing the first substrate; and between the first substrate and the second substrate, a liquid crystal layer, a spacer, and a light-shielding section, wherein the light-shielding section includes a plurality of column-direction light-shielding sections and a plurality of row-direction light-shielding sections, the plurality of column-direction light-shielding sections arranged in a column direction and shielding parts between the plurality of pixels aligned in a row direction from light, the plurality of row-direction light-shielding sections arranged in the row direction and shielding parts between the plurality of pixels aligned in the column direction from light, the row-direction light-shielding sections include a row-direction light-shielding section that includes a first light-shielding section including an arrangement region of the spacer and a second light-shielding section adjacent to the first light-shielding section in the column direction, and a column-direction position of the second light-shielding section is shifted in a direction opposite to the arrangement region of the spacer relative to a column-direction position of a row-direction light-shielding section adjacent to the second light-shielding section in the row direction.

(2) In an embodiment of the present invention, the liquid crystal panel includes the structure (1), and a column-direction position of a structure superimposed on the second light-shielding section is shifted in the direction opposite to the arrangement region of the spacer relative to a column-direction position of a structure superimposed on a row-direction light-shielding section adjacent to the second light-shielding section in the row direction.

(3) In an embodiment of the present invention, the liquid crystal panel includes the structure (1) or (2), and the row-direction light-shielding sections are arranged in the first substrate.

(4) In an embodiment of the present invention, the liquid crystal panel includes the structure (1), (2), or (3), and the row-direction light-shielding sections are arranged in the second substrate.

(5) In an embodiment of the present invention, the liquid crystal panel includes the structure (1), (2), (3), or (4), and the first light-shielding section defines a row-direction light-shielding section shielding parts between a plurality of blue pixels aligned in the column direction from light.

(6) In an embodiment of the present invention, the liquid crystal panel includes the structure (1), (2), (3), (4), or (5), and the liquid crystal panel satisfies the following expression (1):

$$(A/B) \times 100 \geq 85 (\%) \quad (1)$$

where A (%) represents an aperture ratio of one blue pixel (a) among the blue pixels aligned in the column direction, the blue pixel (a) being shielded from light by the first light-shielding section, and B (%) represents an aperture ratio of a blue pixel (b) adjacent to the blue pixel (a) in a column direction opposite to the first light-shielding section.

(7) Another embodiment of the present invention is a head mounted display device including the liquid crystal panel according to (1), (2), (3), (4), (5), or (6) above.

(8) Yet another embodiment of the present invention is a liquid crystal display device including the liquid crystal panel according to (1), (2), (3), (4), (5), or (6) above.

The present invention can provide a liquid crystal panel which has good visibility and in which a decrease in the display quality is sufficiently suppressed, and a head mounted display and a liquid crystal display device using the same.

DETAILED DESCRIPTION OF THE INVENTION

Definition of Terms

Herein, a viewing surface side means the side closer to a screen (display surface) of a liquid crystal display device or a liquid crystal panel, and a back surface side means the side farther from the screen (display surface) of the liquid crystal display device or the liquid crystal panel.

Hereinafter, a display device according to each embodiment of the present invention is described. The present invention is not limited to the contents described in the embodiments below, and can be subjected to design changes as appropriate to the extent that the configuration of the present invention is satisfied.

Embodiment 1

Figure 1:
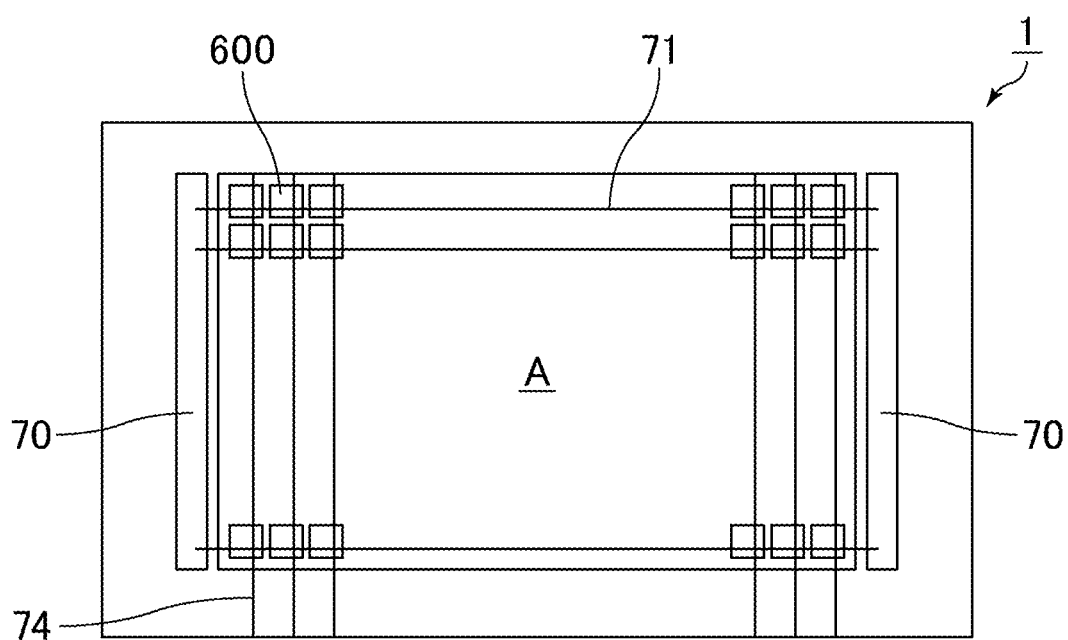
FIG. 1 is a planar schematic view of an entire liquid crystal panel of each of Embodiments 1 to 4 as viewed from the viewing surface side.
Figure 2:
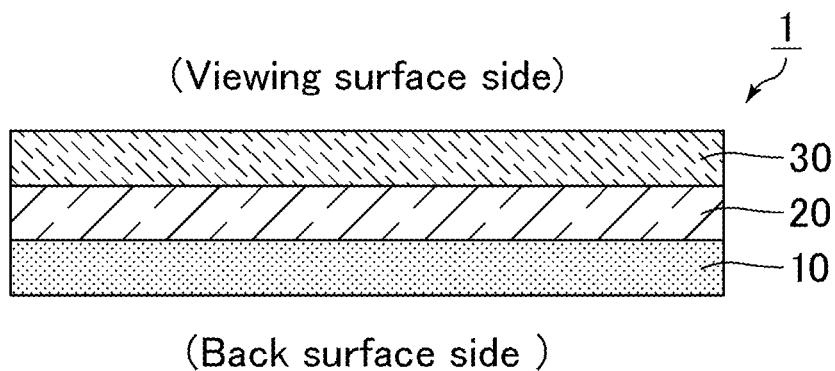
FIG. 2 is a cross-sectional schematic view of the liquid crystal panel of each of Embodiments 1 to 4.
Figure 3:
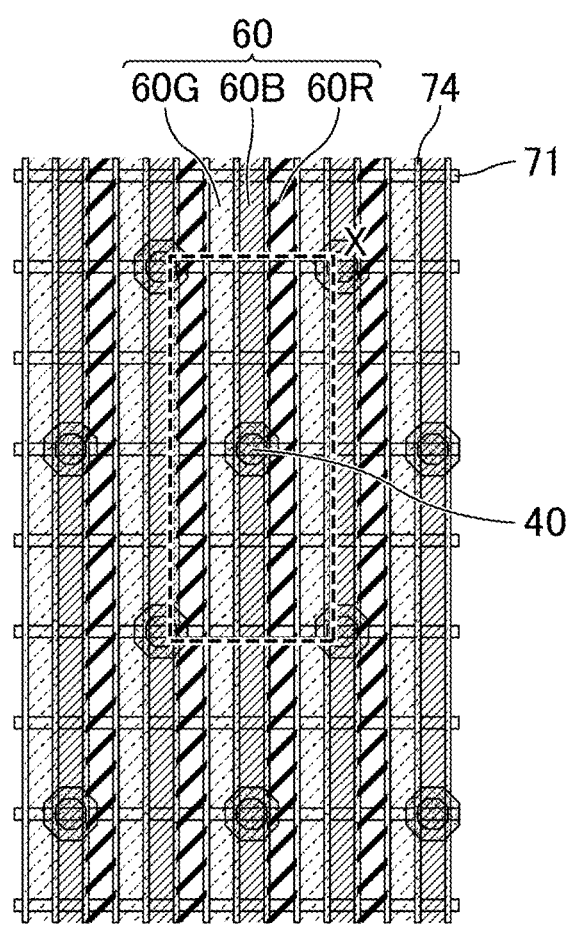
FIG. 3 is a planar schematic view of pixels possessed by the liquid crystal panel of each of Embodiments 1 to 4.
Figure 4:
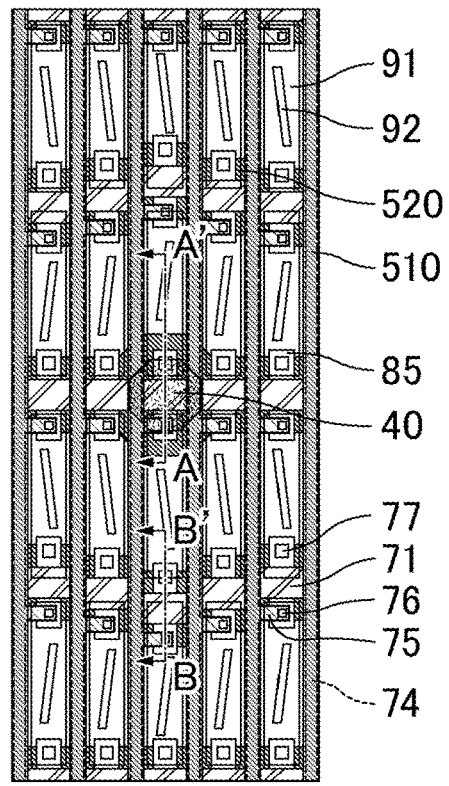
FIG. 4 is an enlarged view of an X section in FIG. 3 in the case of Embodiment 1.
Figure 5:
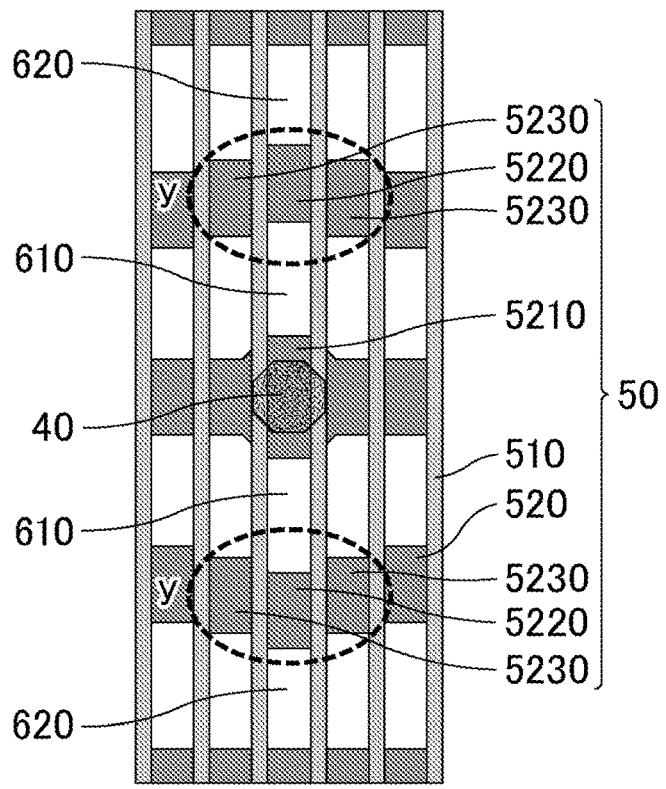
FIG. 5 is a simplified view of FIG. 4.
Figure 6:
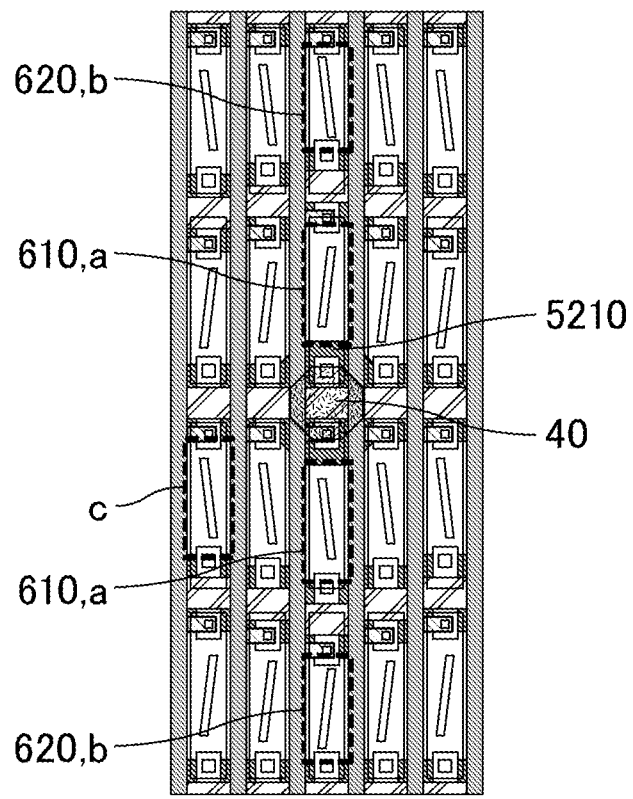
FIG. 6 is a simplified view of FIG. 4.
Figure 7:
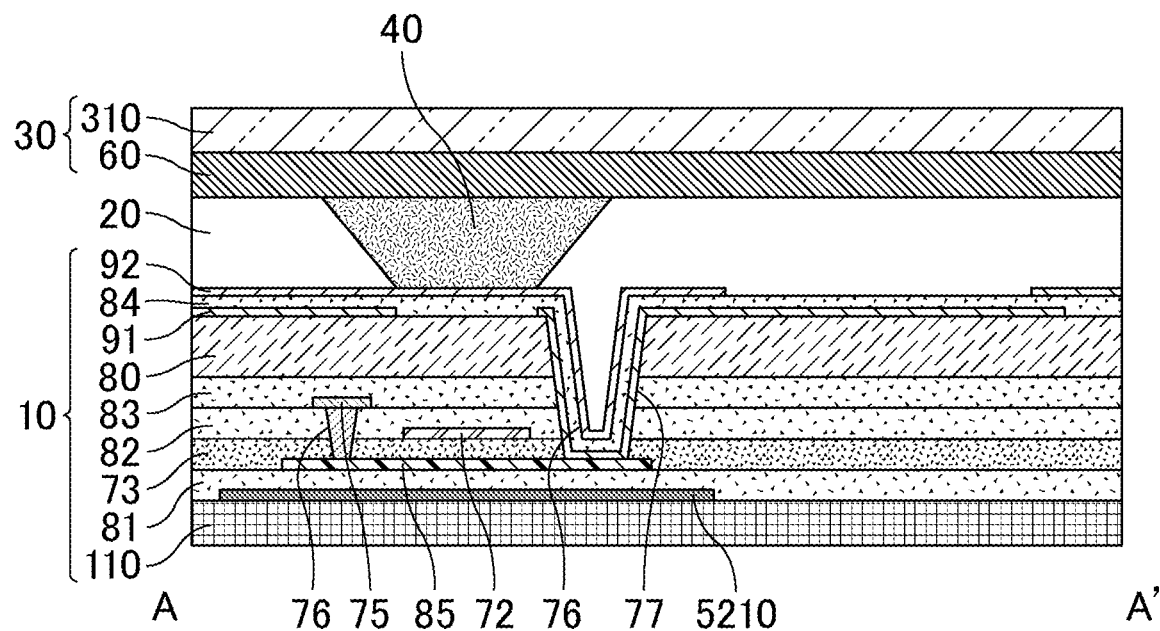
FIG. 7 is a cross-sectional view taken along the A-A' line in FIG. 4 in the case of Embodiment 1 as the cutting plane (A-A' line cross-sectional view).
Figure 8:
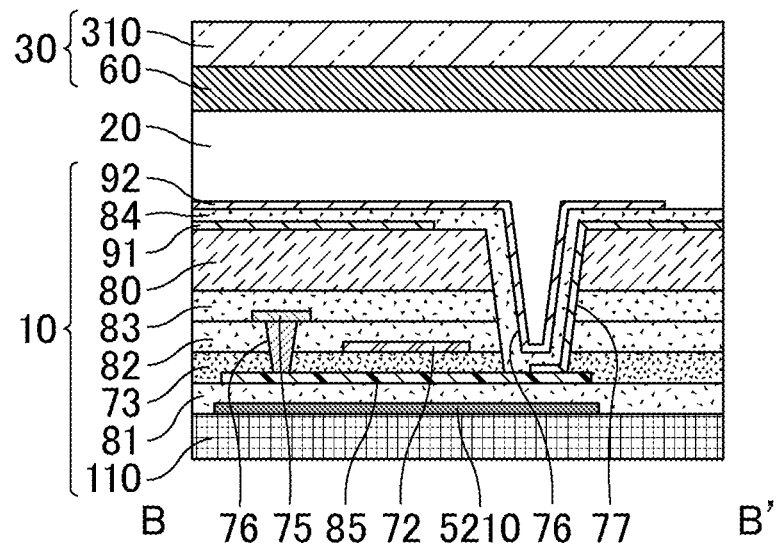
FIG. 8 is a cross-sectional view taken along the B-B' line in FIG. 4 in the case of Embodiment 1 as the cutting plane (B-B' line cross-sectional view).

FIG. 1 is a planar schematic view of an entire liquid crystal panel of the present embodiment as viewed from the viewing surface side. FIG. 2 is a cross-sectional schematic view of the liquid crystal panel of the present embodiment. FIG. 3 is a planar schematic view of pixels possessed by the liquid crystal panel of the present embodiment. For simplification, FIG. 3 illustrates only a color filter layer 60 (red color filters 60R, green color filters 60G, blue color filters 60B), spacers 40, gate lines 71, and source lines 74. FIG. 4 is an enlarged view (conceptual view) of an X section in FIG. 3 (not illustrating the color filter layer 60). FIG. 5 is a simplified view of FIG. 4 to illustrate the relationship between a spacer 40 and a light-shielding section 50 in a way easy to understand. FIG. 6 is a simplified view of FIG. 4 to examine the pixel aperture ratios. FIG. 7 is a cross-sectional view taken along the A-A' line in FIG. 4 as the cutting plane (A-A' line cross-sectional view). FIG. 8 is a cross-sectional view taken along the B-B' line in FIG. 4 as the cutting plane (B-B' line cross-sectional view).

A liquid crystal panel 1 of the present embodiment includes a first substrate 10, a liquid crystal layer 20, and a second substrate 30 in order from the back surface side as illustrated in FIG. 2. In other words, the liquid crystal panel 1 has a structure in which the liquid crystal layer 20 is held between the first substrate 10 and the second substrate 30 which are arranged to face each other. Between the first substrate 10 and the second substrate 30, spacers 40 and a light-shielding section 50 are further arranged (not illustrated in FIG. 2). The present embodiment describes a form of using a TFT substrate including thin-film transistor (referred to as TFT) elements on a support substrate 110 as the first substrate 10 and using a CF substrate including a color filter (referred to as CF) layer 60 on a support substrate 310 as the second substrate 30. The second substrate is also referred to as a counter substrate.

As illustrated in FIG. 1, gate drivers 70 are arranged on both sides (both right and left sides in the drawing) of a display section A in the center of the liquid crystal panel 1. Herein, the gate drivers 70 are arranged on both sides of the display section A, but may be arranged on either the right side or the left side. The display section A has the plurality of source lines (signal lines) 74 arranged parallel to each other along the column direction (vertical direction in the drawing) and the plurality of gate lines (scanning lines) 71 arranged parallel to each other along the row direction (lateral direction in the drawing) to perpendicularly intersect the source lines 74. The plurality of source lines 74 and the plurality of gate line 71 are formed in a matrix shape (grid shape) as a whole to partition the pixels. In other words, the liquid crystal panel 1 of the present embodiment has a plurality of pixels (sub-pixels) 600 arranged in a matrix shape having a plurality of rows and a plurality of columns. In each pixel 600, a TFT as a switching element is arranged at the intersection between a source line 74 and a gate line 71. The TFT is an element having a gate electrode 72, a source electrode 75, and a semiconductor film 85.

The TFT substrate 10 includes various constituent components on the support substrate 110 (see FIGS. 1, 4, and 7, for example). Each source line 74 overlaps with the semiconductor sections (also referred to as the semiconductor films) 85 of the corresponding TFTs via corresponding first contact sections 76. The overlapping sections each serve as the source electrode 75 of the corresponding TFT. The gate lines 71 each serve as the gate electrodes 72 of the corresponding TFTs. A second contact section 77 is provided at the top of the semiconductor film 85, and a first transparent electrode 91 is connected via the second contact section 77. The first transparent electrode 91 serves as a pixel electrode. On the first transparent electrode 91, an insulating film (fourth insulating film 84) is formed and a second transparent electrode 92 is formed on the insulating film. The second transparent electrode 92 serves as a common electrode. The TFT substrate 10 has a planarization film 80 as necessary. Between the layers, insulating films (e.g., first, second, and third insulating films 81, 82, and 83, gate insulator 73, and the like) are provided as necessary.

The CF substrate 30 includes the color filter layer 60 on the support substrate 310 (see FIG. 7, for example). The CF substrate 30 further includes a black matrix (also referred to as a BM). More specifically, a configuration in which the BM and the color filter layer 60 (red color filters 60R, green color filters 60G, and blue color filters 60B) periodically arranged in the grids of the BM are provided on the support substrate 310 is mentioned as an example (see also FIG. 3). The BM functions as the light-shielding section 50. For example, in the present embodiment, the BM formed on the CF substrate 30 constitutes column-direction light-shielding sections 510.

As illustrated in FIGS. 4 and 5, the light-shielding section 50 (column-direction light-shielding sections 510 and row-direction light-shielding sections 520) are arranged that shield inter-pixel parts in the column direction and the row direction from light. The column-direction light-shielding sections 510 are arranged in the second substrate (CF substrate) 30, and the source lines 74 are arranged in the first substrate (TFT substrate) 10 to overlap with the column-direction light-shielding sections 510. The column-direction light-shielding sections 510 are arranged along the column direction (vertical direction in the drawing) and shield parts between the plurality of pixels aligned in the row direction (lateral direction in the drawing) from light. The row-direction light-shielding sections 520 are arranged along the row direction and shield parts between the plurality of pixels aligned in the column direction from light. A row-direction light-shielding section 520 may be separated in a dotted line shape or arranged to form one continuous section in a direction along one row. A column-direction light-shielding section 510 may also be separated in a dotted line shape or arranged to form one continuous section in a direction along one row.

The spacer 40 is arranged between the first substrate 10 and the second substrate 30 to overlap with at least one of the row-direction light-shielding sections 520 (first light-shielding section 5210) (see FIGS. 5, 6, and 7). More specifically, the first light-shielding section 5210 is provided in the arrangement region of a spacer 40. In the present embodiment, the row-direction light-shielding sections 520 such as the first light-shielding section 5210 are arranged in the first substrate 10 (see FIG. 7). The first light-shielding section 5210 shields parts between the pixels 610 aligned in the column direction from light (see FIG. 5).

Second light-shielding sections 5220 mean row-direction light-shielding sections adjacent to the first light-shielding section 5210 in the column direction (vertical direction in the drawing) across the pixels 610 (see FIG. 5).

The column-direction position of each second light-shielding section 5220 is shifted in a direction opposite to the arrangement region of the spacer 40 relative to the column-direction positions of row-direction light-shielding sections 5230 adjacent to the second light-shielding section 5220 in the row direction (lateral direction in the drawing) (see particularly y parts in FIG. 5). The column-direction position of each row-direction light-shielding section 5230 may also be shifted in the direction opposite to the arrangement region of the spacer relative to the column-direction position of the row-direction light-shielding section adjacent to the row-direction light-shielding section 5230 in the row direction (row-direction light-shielding section adjacent to the row-direction light-shielding section 5230 in the row direction opposite to the second light-shielding section 5220). By shifting the column-direction positions of the second light-shielding sections 5220 as described above, the aperture ratios of the pixels 610 shielded from light by the first light-shielding section 5210 can be adjusted without changing the column-direction widths of the second light-shielding sections 5220. More specifically, the decrease in the aperture ratios of the pixels 610 can be sufficiently suppressed.

The pixel with which the arrangement region of a spacer 40 overlaps is preferably a blue pixel. This is because a blue color has the lowest visibility in terms of ergonomics, and therefore the effect on the visibility due to the decrease in the aperture ratios is considered to be the smallest. Nevertheless, it is generally considered that, when the pixels are densified to achieve a high resolution, the effect on the visibility is not negligible as described above. However, the liquid crystal panel of the present embodiment can exhibit good visibility even when the pixels are densified to achieve a high resolution, because the shifted column-direction positions of the second light-shielding sections 5220 sufficiently suppress the decrease in the aperture ratios of the pixels 610 aligned in the column direction and shielded from light by the first light-shielding sections 5210.

As illustrated in FIG. 6, for example, when a pixel adjacent to a pixel 610 overlapping with the arrangement region of a spacer 40 in the column direction opposite to the first light-shielding section 5210 is defined as a pixel 620, and the aperture ratio of the pixel 610 is defined as A (%) and the aperture ratio of the pixel 620 is defined as B (%), then A=B is ideally suitable. This is because the visibility is the highest. When A is excessively small, there is a risk that the spacer 40 is visible. In practical use, A and B suitably satisfy Expression (1) below.

$$(A/B) \times 100 \geq 85(\%) \quad (1)$$

{(A/B)×100} is more preferably 90% or more and still more preferably 95% or more. A preferable upper limit is 100%.

In particular, it is suitable that Expression (1) above is satisfied when the pixel 610 is a blue pixel. More specifically, it is particularly preferable that Expression (1) above is satisfied when the aperture ratio of one pixel (referred to as a pixel a) among the blue pixels 610 aligned in the column direction, the pixel a being-shielded from light by the first light-shielding section 5210, is defined as A (%) and the aperture ratio of the blue pixel (referred to as a pixel b) adjacent to the blue pixel a in the column direction opposite to the first light-shielding section 5210 is defined as B (%). The human vision has the lowest sensitivity to the blue color, and thus the allowance for the decrease in the visibility due to the decrease in the aperture ratio is high. Hence, when Equation (1) above is satisfied when the pixel a is a blue pixel, most humans cannot visually recognize the part where the spacer 40 is arranged. In the present invention, the column-direction position of the second light-shielding section 5220 is suitably moved in the direction opposite to the arrangement region of the spacer 40 relative to the column-direction positions of the row-direction light-shielding sections 5230 such that Equation (1) above is satisfied particularly in blue pixels.

The relationship between the aperture ratios A and B of the pixels a and b, respectively, and the aperture ratios of pixels not overlapping with the arrangement region of the spacer 40 (e.g., a pixel c in FIG. 6) are not particularly limited. For example, when the aperture ratio of the pixel c is defined as C (%), inequalities C>A and C>B usually hold due to the presence of the spacer 40. However, when the adjustment to a desired color can be achieved by adjusting the hue by a material or the film thickness of the color filters, the A/C ratio and the B/C ratio are not particularly limited. For example, when the pixels a and b are blue color filter pixels and the pixel c is a red color filter pixel, the adjustment of the hue can be achieved by adjusting the color of the blue color filters to be deep (e.g., by using deep color materials or increasing the film thickness, for example), and therefore the A/C ratio and the B/C ratio can be adjusted.

In the present embodiment, the column-direction positions of structures superimposed on the second light-shielding section 5220 are shifted in the direction opposite to the arrangement region of the spacer 40 relative to the column-direction positions of structures superimposed on the row-direction light-shielding sections 5230 adjacent to the second light-shielding sections 5220 in the row direction (see FIGS. 4 and 5). When the column-direction position of each second light-shielding section 5220 is shifted, in-pixel structures (e.g., gate electrode, TFT, contact section, and like) which are supposed to be shielded from light by the second light-shielding section 5220 appear in an aperture section in some cases. This case fails to facilitate control of the aperture ratios or makes it more difficult to further suppress light leakage to further enhance the contrast ratio in some cases. However, in the present embodiment, the structures superimposed on the second light-shielding section 5220 are also similarly moved with the second light-shielding section 5220. In other words, the column-direction positions of the structures superimposed on the second light-shielding section 5220 are moved such that the structures superimposed on the second light-shielding section 5220 can be shielded from light even after the column-direction position of the second light-shielding section 5220 is shifted. This makes it easier to control the aperture ratios and also makes it possible to more sufficiently suppress the light leakage and even further enhance the contrast ratio.

In the present embodiment, the liquid crystal mode of the liquid crystal panel is not particularly limited, and may be a mode in which black display is performed by aligning liquid crystal molecules in the liquid crystal layer vertically to the substrate surface or may be a mode in which black display is performed by aligning the liquid crystal molecules in the liquid crystal layer parallel or in a direction neither vertical nor parallel to the substrate surface. The drive system of the liquid crystal panel may be a simple matrix system (passive matrix system), a plasma address system, or the like besides the TFT system (active matrix system).

The liquid crystal panel of the present embodiment can perform display by applying a voltage between the pixel electrodes and the common electrode and generating a transverse field (including a fringe field) or a vertical electric field in the liquid crystal layer. The transverse field system includes a Fringe Field Switching (FFS) mode or an In-Plane Switching (IPS) mode, in which the liquid crystal molecules in the liquid crystal layer are aligned parallel to the substrate surfaces when no voltage is applied. The longitudinal field system includes vertical alignment (VA) in which the liquid crystal molecules in the liquid crystal layer are aligned vertically to the substrate surfaces when no voltage is applied.

The liquid crystal panel of the present embodiment may be a low-resolution liquid crystal panel or a high-resolution liquid crystal panel. As described above, the effect on the pixel aperture ratios caused by the spacers 40 poses a particularly noticeable problem in the high-resolution liquid crystal panel. However, the liquid crystal panel of the present invention can sufficiently exhibit the effect that the visibility is good and the decrease in the display quality is sufficiently suppressed even in the case of the high-resolution liquid crystal panel. Hence, the liquid crystal panel of the present embodiment is suitably a high-resolution liquid crystal panel.

The liquid crystal panel of the present embodiment can be produced by, for example, bonding the CF substrate (counter substrate) 30 and the TFT substrate 10, which are manufactured by the methods described below, to each other, injecting a liquid crystal composition into the gap therebetween to form the liquid crystal layer 20, and then dividing the obtained structure (see FIG. 7 as appropriate).

(1) Method for Manufacturing CF Substrate 30

First, a light-shielding film is formed on the support substrate 310, and then the light-shielding film is patterned into a desired shape by photolithography, so that the plurality of column-direction light-shielding sections 510 is formed. As a material of the light-shielding film, a material used as a material of the black matrix (BM) may be used, for example. Specifically, black photosensitive resin materials may be acceptable or metallic materials may be acceptable. When the resin materials are used, for example, the thickness of the light-shielding section to be obtained is not particularly limited, and it is preferable that the lower limit is 10 nm or more and the upper limit is 10 μm or less, for example. More preferably, the lower limit is 100 nm or more and the upper limit is 3 μm or less.

Next, the red color filter 60R, the green color filter 60G, and the blue color filter 60B are sequentially formed in regions corresponding to a red pixel R, a green pixel G, and a blue pixel B, respectively, and thereby the color filter layer 60 is formed. As materials of the color filters, colored photosensitive resin materials are usable, for example. In usual, a combination of the red color filter 60R, the green color filter 60G, and the blue color filter 60B is arranged in each pixel, and a desired color is obtained in each pixel by mixing the colors while controlling the amount of a colored light transmitting through each of the red color filter 60R, the green color filter 60G, and the blue color filter 60B. The surface of the color filter layer 60 facing the liquid crystal layer 20 may or may not be planarized. When planarized, a planarization film covering the color filter layer 60 may also be provided.

Thereafter, the plurality of spacers 40 is formed. The spacers 40 are formed of a resin material transparent to light, for example. The spacers 40 are arranged to overlap with the row-direction light-shielding sections 520 (particularly first light-shielding section 5210) formed in the TFT substrate 10 described later. Further, the arrangement regions of the spacers 40 preferably overlap with the blue pixels as described above, and therefore the spacers 40 are arranged at positions where the blue color filters 60B are shielded from light in the column direction.

Finally, an alignment film (not illustrated) is formed as necessary on the color filter layer 60 (or the planarization film), whereby the CF substrate 30 is obtained. The alignment film is subjected to alignment treatment (e.g., optical alignment treatment).

(2) Method for Manufacturing TFT Substrate 10

First, a conductive film is formed on the support substrate 110, and then the conductive film is patterned into a desired shape by photolithography, so that the plurality of row-direction light-shielding sections 520 (e.g., first light-shielding section 5210, second light-shielding section 5220, row-direction light-shielding sections 5230 adjacent to the second light-shielding section 5220 in the row direction, and the like) is formed. A material of the conductive film is not particularly limited, and metallic materials used as the material of the black matrix (BM) may be used, for example. Specific examples include tungsten (W) and the like. When the metallic materials are used, for example, the thickness of the light-shielding sections to be obtained is not particularly limited, and it is preferable that the lower limit is 10 nm or more and the upper limit is 1000 nm or less, for example. More preferably, the lower limit is 30 nm or more and the upper limit is 500 nm or less.

Next, an insulating film (first insulating film 81) is formed, the semiconductor section (semiconductor film) 85 of each TFT is formed on the first insulating film 81, and then the semiconductor film is patterned into a desired shape by photolithography. The semiconductor film 85 is suitably an In—Ga—Zn—O-based oxide semiconductor film, for example. The semiconductor film 85 may also be constituted by a high-resistance semiconductor layer containing amorphous silicon, polysilicon, or the like and a low-resistance semiconductor layer containing n+ amorphous silicon obtained by doping amorphous silicon with impurities, such as phosphorus, or the like. The thickness of the semiconductor film 85 is not particularly limited, and it is preferable that the lower limit is 10 nm or more and the upper limit is 1000 nm or less, for example. More preferably, the lower limit is 30 nm or more and the upper limit is 500 nm or less.

Next, the gate insulator 73 is formed, a conductive film is formed on the gate insulator 73, and then the conductive film is patterned into a desired shape by photolithography, so that the gate lines 71 and the gate electrodes 72 are formed. Materials of the gate lines 71 and the gate electrodes 72 include metals, such as copper, titanium, aluminum, molybdenum, and tungsten, and alloys thereof, for example, and a single layer may be acceptable or a multilayer laminated structure may be acceptable.

Next, an insulating film (second insulating film 82) is formed, and then an aperture section is formed by photolithography in a region to be a contact hole (first contact section 76) later (i.e., removing the insulating film formed in this region).

Next, a conductive film is formed on the second insulating film 82, and then the conductive film is patterned into a desired shape by photolithography, so that the source lines 74 and the source electrodes 75 are formed. Materials of the source lines 74 and the source electrodes 75 include metals, such as copper, titanium, aluminum, molybdenum, and tungsten, and alloys thereof, for example, and a single layer may be acceptable or a multilayer laminated structure may be acceptable.

Next, an insulating film (third insulating film 83) is formed, and then an aperture section is formed by photolithography in a region to be a contact hole (second contact section 77) later (i.e., removing the insulating film formed in this region).

Next, the planarization film 80 is formed on the third insulating film 83, and then an aperture section is formed by photolithography in a region to be the contact hole (second contact section 77) later (i.e., removing the planarization film formed in this region).

Next, a transparent conductive film is formed on the planarization film 80, and then the transparent conductive film is patterned into a desired shape by photolithography, so that transparent electrodes (first transparent electrodes 91) are formed. In the present embodiment, the first transparent electrodes 91 function as the pixel electrodes.

Next, an insulating film (fourth insulating film 84) is formed, a transparent conductive film is formed on the fourth insulating film 84, and then the transparent conductive film is patterned into a desired shape by photolithography, so that a transparent electrode (second transparent electrode 92) is formed. In the present embodiment, the second transparent electrode 92 functions as the common electrode.

Finally, an alignment film (not illustrated) is formed as necessary, whereby the TFT substrate 10 is obtained. The alignment film is subjected to alignment treatment (e.g., optical alignment treatment).

The support substrates 110 and 310 are insulating substrates. The support substrates 110 and 310 are preferably transparent substrates. Examples include a glass substrate, a plastic substrate, and the like, for example.

The transparent electrodes 91 and 92 (and 93 described later) can be formed of transparent conductive materials, such as indium tin oxide (ITO), indium zinc oxide (IZO), zinc oxide (ZnO), and tin oxide (SnO) or alloys thereof, for example. The thickness of the transparent electrodes is not particularly limited, and it is preferable that the lower limit is 10 nm or more and the upper limit is 1000 nm or less, for example. More preferably, the lower limit is 30 nm or more and the upper limit is 500 nm or less.

The insulating films 81, 82, 83, and 84 and the gate insulator 73 are preferably inorganic insulating films, for example. As the inorganic insulating films, inorganic films (relative permittivity ε=5 to 7) containing silicon nitride (SiNx), silicon dioxide ($SiO_2$), and the like or laminated films thereof are usable, for example. The thickness of the insulating films is not particularly limited, and it is preferable that the lower limit is 10 nm or more and the upper limit is 1000 nm or less, for example. More preferably, the lower limit is 30 nm or more and the upper limit is 500 nm or less.

A planarization film (planarization film 80 or the like) is preferably an organic insulating film, for example. As the organic insulating film, organic films with a low relative permittivity (relative permittivity ε=2 to 5), such as a photosensitive resin, or laminated films thereof are usable, for example. Specific examples include organic films, such as an acrylic resin, a polyimide resin, and a novolac resin, and laminates thereof, for example. The thickness of the planarization film is not particularly limited, and it is preferable that the lower limit is 10 nm or more and the upper limit is 5000 nm or less, for example. More preferably, the lower limit is 30 nm or more and the upper limit is 3000 nm or less.

The description above gives the example of the configuration in which the TFT substrate 10 has the planarization film 80, but the planarization film 80 does not have to be provided. Although the description above gives the example of the configuration in which the second transparent electrode 92 functioning as the common electrode is positioned above the first transparent electrodes 91 functioning as the pixel electrodes, a configuration may be adopted in which the first transparent electrodes 91 functioning as the pixel electrodes are positioned above the second transparent electrode 92 functioning as the common electrode. Further, although the description above gives the example of the form of performing display in the FFS mode (i.e., using the transverse field), a form of performing display using a vertical electric field, such as a VA mode, may also be adopted. In this case, the common electrode facing the pixel electrodes is provided in the counter substrate 30.

In the present embodiment, the column-direction position of each second light-shielding section 5220 is shifted in the direction opposite to the arrangement region of the spacer 40 relative to the column-direction positions of the row-direction light-shielding sections 5230 adjacent to the second light-shielding section 5220 in the row direction. In the present embodiment, further, the column-direction positions of the structures superimposed on the second light-shielding section 5220 are moved such that the structures superimposed on the second light-shielding section 5220 can be shielded from light even after the column-direction position of the second light-shielding section 5220 is shifted.

The following description is given taking a liquid crystal display device including the liquid crystal panel of the present embodiment as an example.

Figure 9:
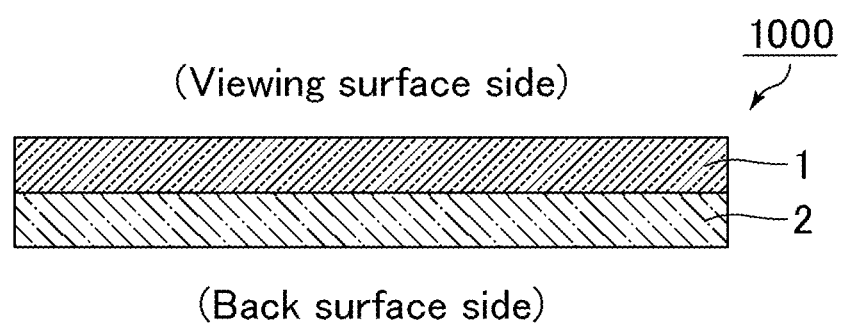
FIG. 9 is a cross-sectional schematic view of a liquid crystal display device of Embodiment 1.

FIG. 9 is a cross-sectional schematic view of a liquid crystal display device of the present embodiment. As illustrated in FIG. 9, a liquid crystal display device 1000 of the present embodiment includes the liquid crystal panel 1 of the present embodiment and a backlight 2.

The backlight 2 is not particularly limited insofar as light is emitted, and a direct-lit backlight, an edge-lit backlight, or a backlight of any other type may be acceptable. Specifically, the backlight 2 preferably includes a light source unit containing a light guide plate and a light source, a reflective sheet, and a diffusion sheet, for example. As the light source, a light-emitting diode (LED) is usable, for example.

The liquid crystal display device of the present embodiment is constituted by, in addition to the above-described members, a plurality of members including polarizing plates; external circuits such as a tape carrier package (TCP) and a printed circuit board (PCB); optical films such as a viewing angle expansion film and a luminance enhancement film; and a bezel (frame). Some members may be incorporated into other members. The members other than the members already described above are not particularly limited, and those usually used in the liquid crystal display device field are usable. The description of the members is thus omitted.

Figure 10:
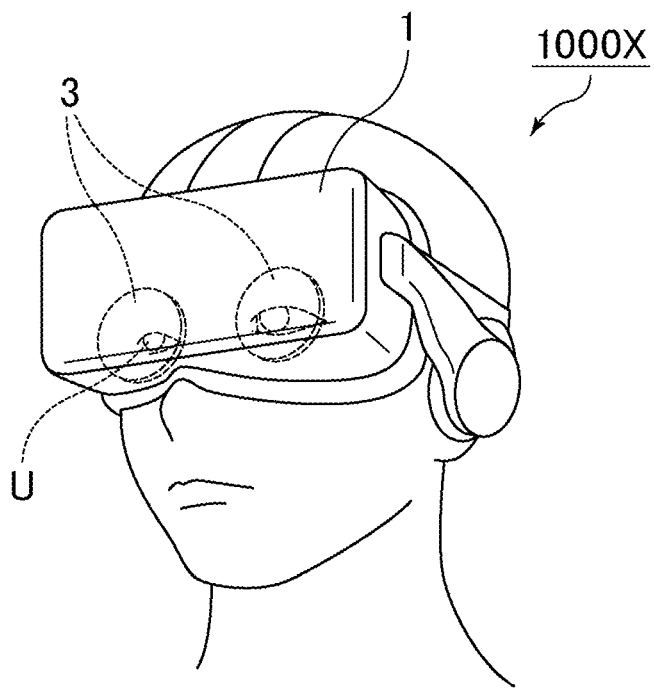
FIG. 10 is a perspective schematic view illustrating one example of the appearance of an HMD including the liquid crystal panel of Embodiment 1.

FIG. 10 is a perspective schematic view illustrating one example of the appearance when the liquid crystal display device of the present embodiment is used as a head mounted display (HMD), i.e., one example of the appearance of the HMD including the liquid crystal panel of the present embodiment. As illustrated in FIG. 10, a head mounted display 1000X is a display device including the liquid crystal panel 1 of the present embodiment for displaying an image, an optical element 3, and a backlight (not illustrated), and wearable on the head of a user. The optical element 3 is a lens, for example. This figure illustrates a binocular HMD as an example, but a monocular HMD may be acceptable.

The display system of the HMD is not particularly limited, and any of various display modes such as a horizontal alignment mode and a vertical alignment mode is preferably adopted. For example, as the HMD utilizing the horizontal alignment mode, the technology characterized by the aperture shape of an electrode used to form a fringe electric field as described in JP 2019-113584 A is suitably adopted.

Embodiment 2

The present embodiment mainly describes features specific to the present embodiment, and omits the description of the contents overlapping with the contents of Embodiment 1 above. The present embodiment describes a mode in which the row-direction light-shielding sections 520 are arranged in the second substrate 30.

Figure 11:
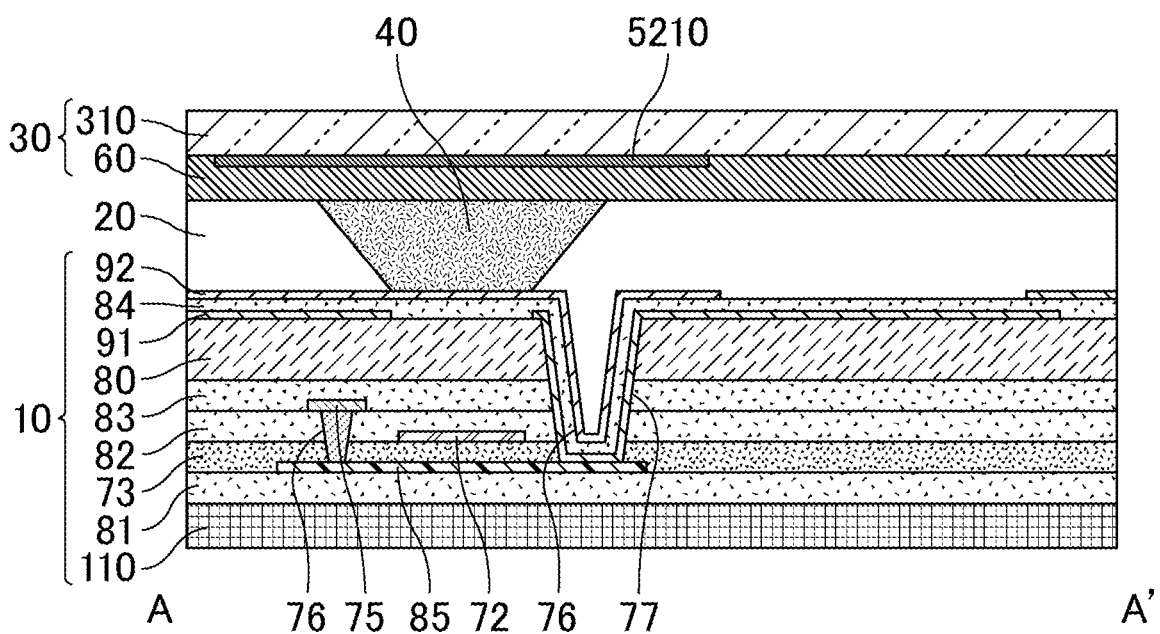
FIG. 11 is a cross-sectional view taken along the A-A' line in FIG. 4 in the case of Embodiment 2 as the cutting plane (A-A' line cross-sectional view).

FIG. 1 is also a planar schematic view of an entire liquid crystal panel of the present embodiment as viewed from the viewing surface side. FIG. 2 is also a cross-sectional schematic view of the liquid crystal panel of the present embodiment. FIG. 3 is also a planar schematic view of pixels possessed by the liquid crystal panel of the present embodiment. FIG. 4 is an enlarged view (conceptual view) of an X section in FIG. 3 (not illustrating a color filter layer 60). FIG. 5 is a simplified view of FIG. 4 to illustrate the relationship between a spacer 40 and a light-shielding section 50 in a way easy to understand. FIG. 6 is a simplified view of FIG. 4 to examine the pixel aperture ratios. FIG. 11 is a cross-sectional view taken along the A-A' line in FIG. 4 as the cutting plane (A-A' line cross-sectional view).

In Embodiment 1, the row-direction light-shielding sections 520 are arranged in the first substrate 10 (see FIG. 7), while, in the present embodiment, the row-direction light-shielding sections 520 are arranged in the second substrate 30 (see FIG. 11). The other configurations are the same as those of the liquid crystal panel of Embodiment 1. Also in the liquid crystal panel of the present embodiment, the visibility is good and the decrease in the display quality is sufficiently suppressed.

The liquid crystal panel of the present embodiment can be produced by, for example, bonding the CF substrate (counter substrate) 30 and the TFT substrate 10, which are manufactured by the methods described below, to each other, injecting a liquid crystal composition into the gap therebetween to form the liquid crystal layer 20, and then dividing the obtained structure (see FIG. 11 as appropriate).

(1) Method for Manufacturing CF Substrate 30

Although the method described in (1) above in Embodiment 1 involves first forming the plurality of column-direction light-shielding sections 510 on the support substrate 310, the method of the present embodiment involves forming a light-shielding film on the support substrate 310, and then patterning the light-shielding film into a desired shape by photolithography, so that the plurality of column-direction light-shielding sections 510 and the plurality of row-direction light-shielding sections 520 are formed. Other than the above, the method of the present embodiment is the same as the method of (1) above in Embodiment 1.

(2) Method for Manufacturing TFT Substrate 10

Although the method described in (2) above in Embodiment 1 involves first the step of forming the plurality of row-direction light-shielding sections 520 on a support substrate 110, this step is omitted in the present embodiment. More specifically, an insulating film (first insulating film 81) is formed on the support substrate 110. Other than the above, the method of the present embodiment is the same as the method of (2) above in Embodiment 1.

Embodiment 3

The present embodiment mainly describes features specific to the present embodiment, and omits the description of the contents overlapping with the contents of Embodiment 1 above. The present embodiment describes a mode of providing color filters in the TFT substrate, i.e., a mode in which a liquid crystal panel has a COA (Color filter On Array) structure.

Figure 12:
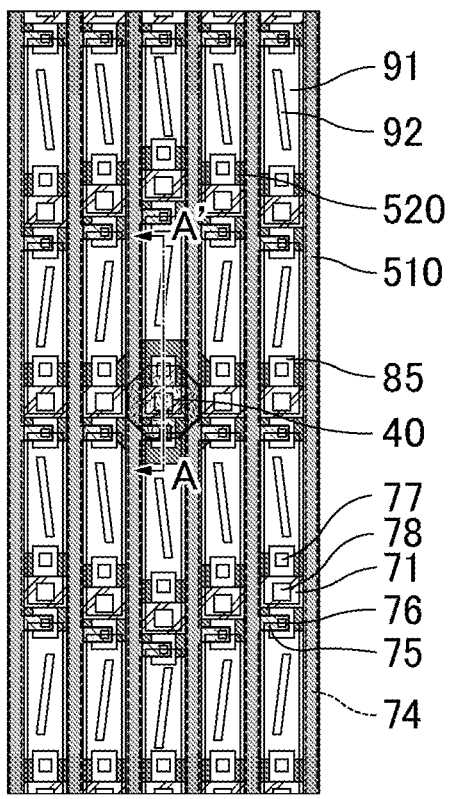
FIG. 12 is an enlarged view of an X section in FIG. 3 in the case of Embodiment 3.
Figure 13:
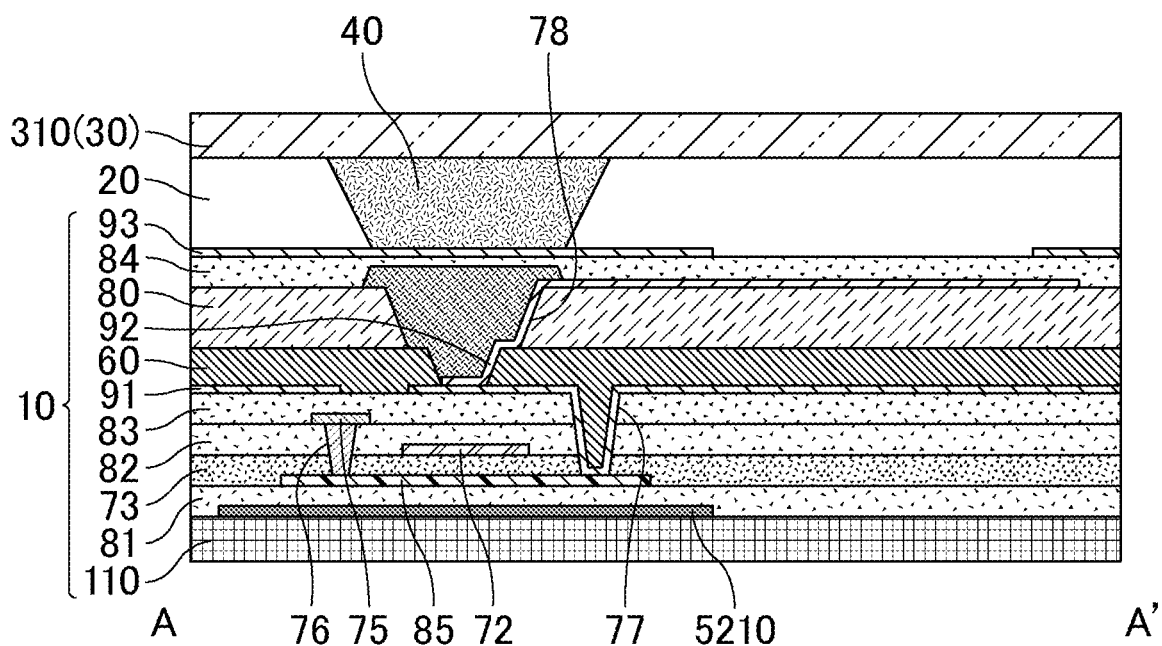
FIG. 13 is a cross-sectional view taken along the A-A' line in FIG. 12 in the case of Embodiment 3 as the cutting plane (A-A' line cross-sectional view).

FIG. 1 is also a planar schematic view of an entire liquid crystal panel of the present embodiment as viewed from the viewing surface side. FIG. 2 is also a cross-sectional schematic view of the liquid crystal panel of the present embodiment. FIG. 3 is also a planar schematic view of pixels possessed by the liquid crystal panel of the present embodiment. FIG. 12 is an enlarged view (conceptual view) of an X section in FIG. 3 (not illustrating a color filter layer 60). FIG. 13 is a cross-sectional view taken along the A-A' line in FIG. 12 as the cutting plane (A-A' line cross-sectional view).

In Embodiment 1, the TFT substrate is used as the first substrate 10 and the CF substrate is used as the second substrate 30 (see FIG. 7), while, in the present embodiment, the TFT substrate having the COA structure is used as the first substrate 10 and a support substrate 310 is used as the second substrate (counter substrate) 30 (see FIG. 13). Also in the liquid crystal panel of the present embodiment, the visibility is good and the decrease in the display quality is sufficiently suppressed.

The TFT substrate 10 includes various constituent components on a support substrate 110 (see FIGS. 1, 12, and 13, for example). Each source line 74 overlaps with the semiconductor sections (semiconductor film) 85 of the corresponding TFTs via corresponding first contact sections 76. The overlapping sections each serve as the source electrode 75 of the corresponding TFT. The gate lines 71 each serve as the gate electrodes 72 of the corresponding TFTs. A second contact section 77 is provided at the top of the semiconductor film 85 and a first transparent electrode 91 is connected via the second contact section 77. On the first transparent electrode 91, the color filter layer 60 and a planarization film 80 are formed, and a second transparent electrode 92 is formed on the color filter layer 60 and the planarization film 80. The second transparent electrode 92 serves as a pixel electrode. On the second transparent electrode 92, an insulating film (fourth insulating film 84) is formed, and then a third transparent electrode 93 is formed on the insulating film. The third transparent electrode 93 serves as a common electrode. Between the layers, insulating films (e.g., first, second, and third insulating films 81, 82, and 83, gate insulator 73, and the like) are provided as necessary.

The liquid crystal panel of the present embodiment can be produced by, for example, bonding the second substrate (counter substrate) 30 and the TFT substrate 10, which are manufactured by the methods described below, to each other, injecting a liquid crystal composition into the gap therebetween to form the liquid crystal layer 20, and then dividing the obtained structure (see FIG. 13 as appropriate).

(1) Method for Manufacturing Counter Substrate 30

A plurality of spacers 40 is formed on the support substrate 310. The spacers 40 are arranged to overlap with the row-direction light-shielding sections 520 (particularly first light-shielding sections 5210) formed in the TFT substrate 10 described later. The spacers 40 are arranged at positions where blue color filters 60B to be formed in the TFT substrate 10 described later are shielded from light in the column direction.

(2) Method for Manufacturing TFT Substrate 10

First, a conductive film is formed on the support substrate 110, and then the conductive film is patterned into a desired shape by photolithography, so that the plurality of row-direction light-shielding sections 520 and the plurality of column-direction light-shielding sections 510 are formed. Thereafter, the steps up to the step of forming a third insulating film 83 and removing the insulating film present in a region to be a contact hole (second contact section 77)

later are performed in the same manner as in the method described in (2) above in Embodiment 1.

Next, a transparent conductive film is formed on the third insulating film 83, and then the transparent conductive film is patterned into a desired shape by photolithography, so that a transparent electrode (first transparent electrode 91) is formed.

Next, a material of color filters (for example, colored photosensitive resin material) is formed into a film, and then an aperture section is formed in a region to be a contact hole (third contact section 78) later (i.e., removing the color filter layer 60 formed in this region). This step is performed for each of red, green, and blue color filter materials, so that a red color filter 60R, a green color filter 60G, and a blue color filter 60B are formed in regions corresponding to a red pixel R, a green pixel G, and a blue pixel B, respectively.

Next, a planarization film 80 is formed on the color filter layer 60, and then an aperture section is formed by photolithography in a region to be a contact hole (third contact section 78) later (i.e., removing the planarization film formed in this region).

Next, a transparent conductive film is formed on the planarization film 80, and then the transparent conductive film is patterned into a desired shape by photolithography, so that a transparent electrode (second transparent electrode 92) is formed. In the present embodiment, the second transparent electrode 92 functions as a pixel electrode.

Next, the planarization film 80 (second planarization film) is formed, and only the planarization film 80 present in a region to be a contact hole (third contact section 78) later is left by photolithography. In other words, the planarization film is present inside the third contact section 78. The third contact section 78 is filled with the planarization film, so that a pixel section is planarized.

Next, an insulating film (fourth insulating film 84) is formed, a transparent conductive film is formed on the fourth insulating film 84, and then the transparent conductive film is patterned into a desired shape by photolithography, so that a transparent electrode (third transparent electrode 93) is formed. In the present embodiment, the third transparent electrode 93 functions as a common electrode.

Finally, an alignment film (not illustrated) is formed as necessary, whereby the TFT substrate 10 is obtained. The alignment film is subjected to alignment treatment (e.g., optical alignment treatment).

Embodiment 4

The present embodiment mainly describes features specific to the present embodiment, and omits the description of the contents overlapping with the contents of Embodiment 1 above. Embodiment 4 describes a mode in which the column-direction positions of the structures superimposed on a second light-shielding section 5220 are not moved.

Figure 14:
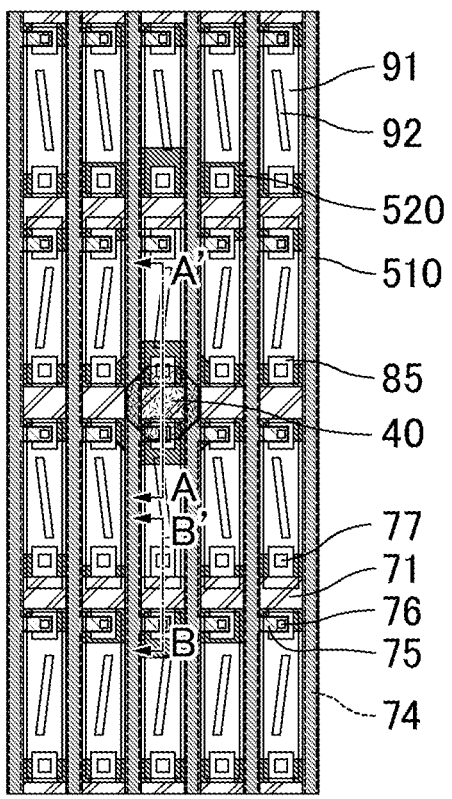
FIG. 14 is an enlarged view of an X section in FIG. 3 in the case of Embodiment 4.
Figure 15:
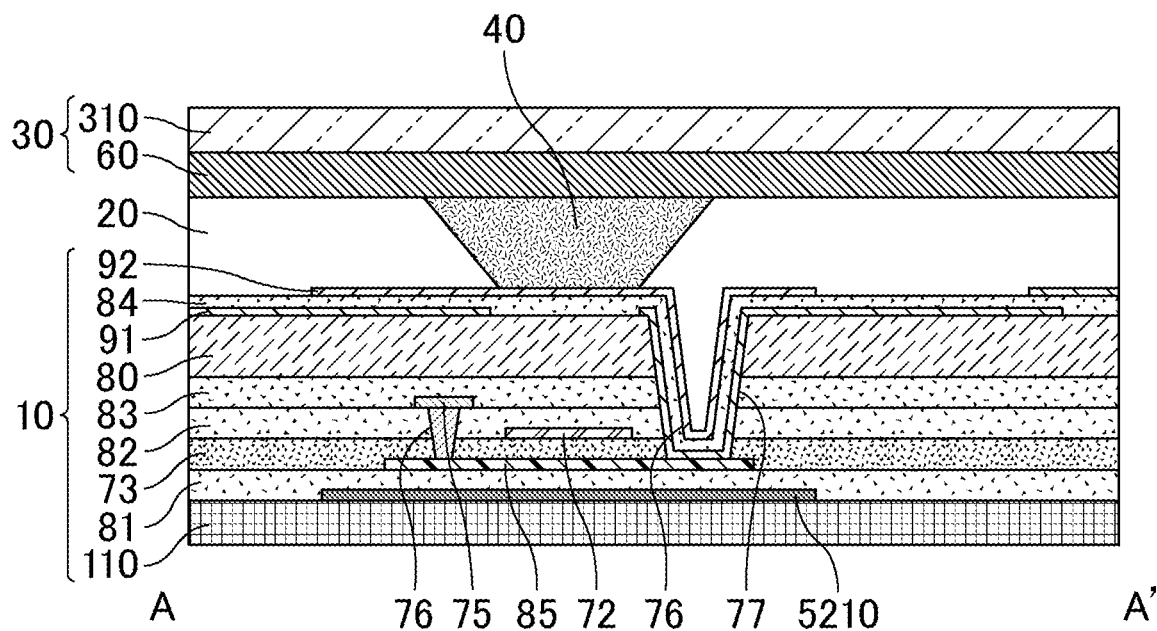
FIG. 15 is a cross-sectional view taken along the A-A' line in FIG. 14 in the case of Embodiment 4 as the cutting plane (A-A' line cross-sectional view).
Figure 16:
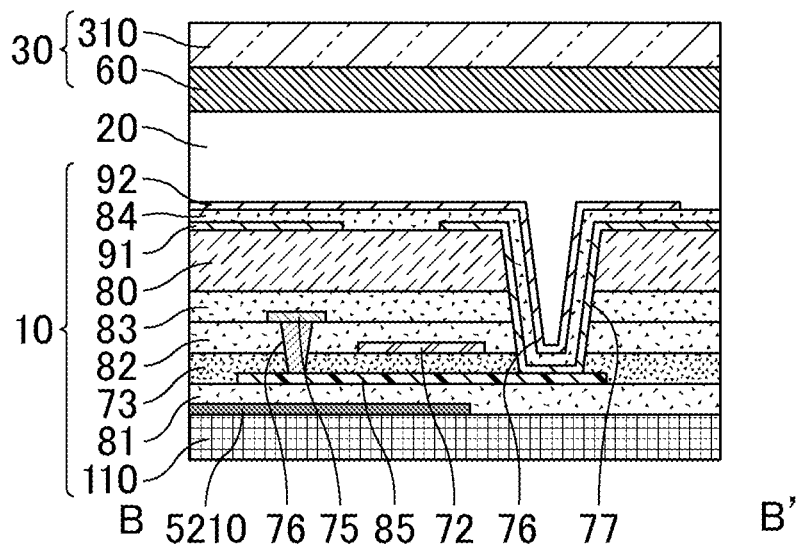
FIG. 16 is a cross-sectional view taken along the B-B' line in FIG. 14 in the case of Embodiment 4 as the cutting plane (B-B' line cross-sectional view).
Figure 17:
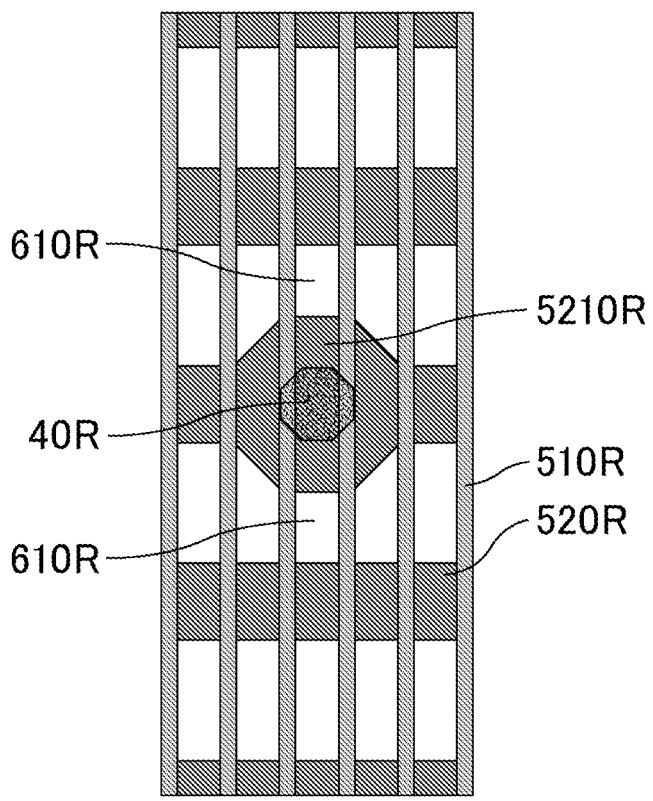
FIG. 17 is a planar schematic view of pixels of a conventional liquid crystal panel.
Figure 18:
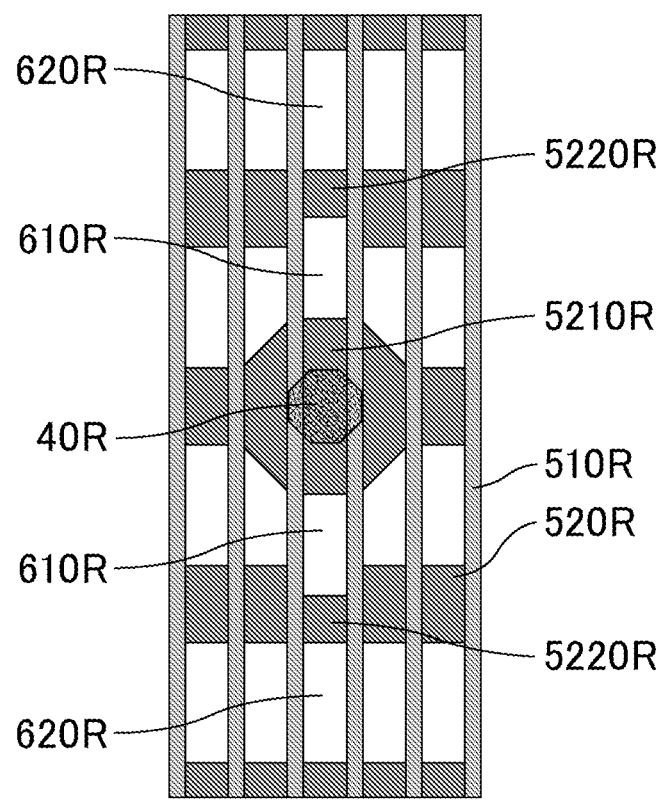
FIG. 18 is a planar schematic view of pixels possessed by a liquid crystal display device described in JP 2016-122175 A.
Figure 19:
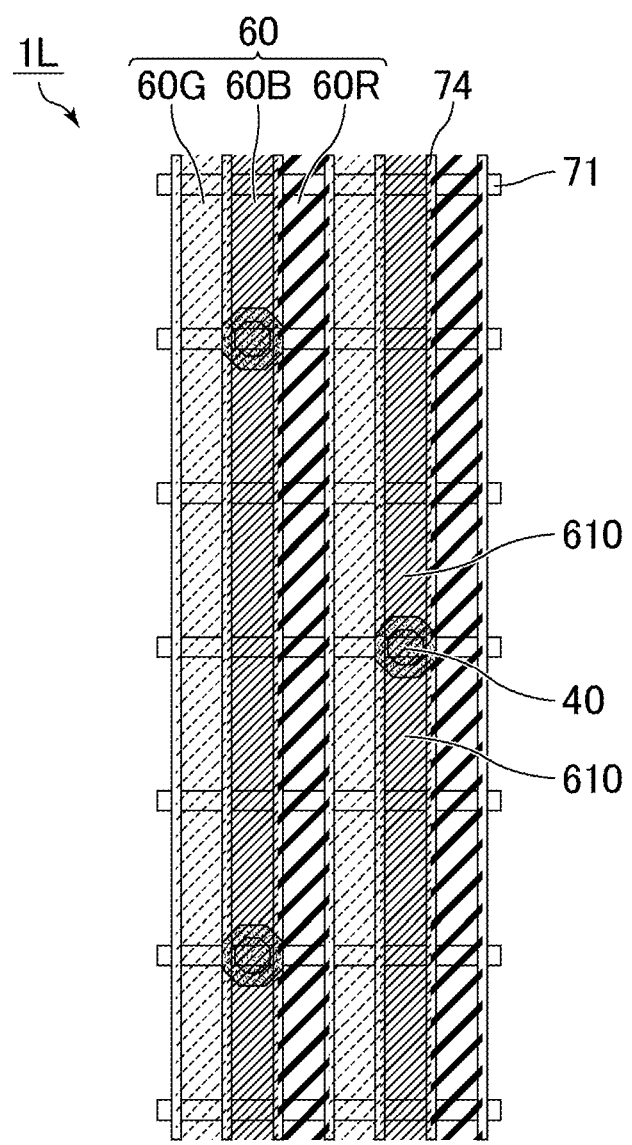
FIG. 19 is a planar schematic view of pixels of a low-resolution liquid crystal panel 1L.
Figure 20:
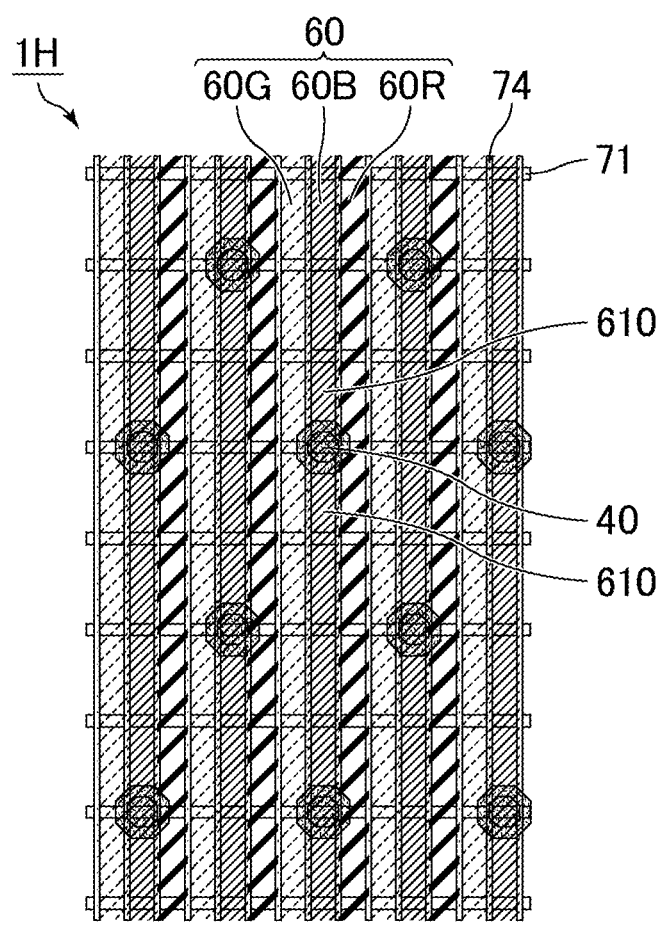
FIG. 20 is a planar schematic view of pixels of a high-resolution liquid crystal panel 1H.

FIG. 1 is also a planar schematic view of an entire liquid crystal panel of the present embodiment as viewed from the viewing surface side. FIG. 2 is also a cross-sectional schematic view of the liquid crystal panel of the present embodiment. FIG. 3 is also a planar schematic view of pixels possessed by the liquid crystal panel of the present embodiment. FIG. 14 is an enlarged view (conceptual view) of an X section in FIG. 3 (not illustrating a color filter layer 60). FIG. 15 is a cross-sectional view taken along the A-A' line in FIG. 14 as the cutting plane (A-A' line cross-sectional view). FIG. 16 is a cross-sectional view taken along the B-B' line in FIG. 14 as the cutting plane (B-B' line cross-sectional view).

In Embodiment 1, the structures superimposed on the second light-shielding section 5220 are also similarly moved with the second light-shielding section 5220. In other words, the column-direction positions of the structures superimposed on the second light-shielding section 5220 are moved such that the second light-shielding section 5220 can shield the structures superimposed on the second light-shielding section 5220 from light even after the column-direction position of the second light-shielding section 5220 is shifted (see FIGS. 4 and 5). In contrast thereto, in the present embodiment, the positions of the structures superimposed on the second light-shielding section 5220 are not moved, and the column-direction position of only the second light-shielding section 5220 is moved. The present embodiment can enhance the processing shape stability of gate lines 71 by keeping the straight shape of the gate lines 71.

Although the embodiments of the present invention are described above, the individual matters described above are all applicable to the present invention as a whole.

EXAMPLES

The present invention is described in more detail with reference to examples and comparative examples below but the present invention is not limited to these examples.

Example 1

The liquid crystal panel of Embodiment 1 was manufactured (see FIGS. 1 to 7). More specifically, a liquid crystal panel 1 was obtained by bonding a CF substrate 30 and a TFT substrate 10, which were manufactured by the methods described below, to each other, injecting a liquid crystal composition (liquid crystal layer 20), and then cutting the bonded substrates.

(1-1) Method for Manufacturing CF Substrate 30

A light-shielding resin film (1000 nm thick) is formed on a glass substrate 310, and then processed into a desired shape by photolithography. The light-shielding resin film serves as column-direction light-shielding sections 510. Thereafter, a color filter (color filter layer 60) is formed at a desired position for every R, G, and B pixel, and the spacers 40 are formed at desired positions.

(1-2) Method for Manufacturing TFT Substrate 10

A conductive film (tungsten film; 50 nm thick) is formed on a glass substrate 110, and the conductive film is processed into a desired shape by photolithography. The conductive film serves as row-direction light-shielding sections 520 (e.g., first light-shielding section 5210, second light-shielding section 5220, row-direction light-shielding section 5230 adjacent to the second light-shielding section 5220 in the row direction, and the like).

Next, a first insulating film 81 (laminated structure of $SiO_2$ (100 nm thick)/SiN (70 nm thick)) is formed.

Next, a semiconductor film 85 (oxide semiconductor (IGZO); 50 nm thick) is formed, and then the semiconductor film is processed into a desired shape by photolithography.

Next, a gate insulator 73 ($SiO_2$; 85 nm thick) is formed.

Next, a conductive film (laminated structure of Ti (100 nm thick)/Al (150 nm thick)/Ti (30 nm thick)) is formed, and then the conductive film is processed into a desired shape by photolithography. The conductive film serves as gate electrodes 72.

Next, a second insulating film 82 ($SiO_2$; 500 nm thick) is formed, and then the insulating film 82 present in a region to be a first contact section 76 is removed by photolithography.

Next, a conductive film (laminated structure of Ti (60 nm thick)/Al (300 nm thick)/Ti (20 nm thick)) is formed, and then the conductive film is processed into a desired shape by photolithography. The conductive film serves as source lines 74 and source electrodes 75.

Next, a third insulating film 83 (SiO$_2$; 500 nm thick) is formed, and then the insulating film 83 present in a region to be a second contact section 77 is removed by photolithography.

Next, a planarization film 80 (photosensitive resin film; 2000 nm thick) is formed, and then the planarization film 80 present in a region to be the second contact section 77 is removed by photolithography.

Next, a first transparent electrode 91 (IZO; 100 nm thick) is formed, and then the transparent electrode 91 is patterned by photolithography. The transparent electrode 91 serves as pixel electrodes.

Next, a fourth insulating film 84 (SiN; 100 nm thick) is formed.

Next, a second transparent electrode 92 (IZO; 100 nm thick) is formed, and then the transparent electrode 92 is patterned by photolithography. The transparent electrode 92 serves as a common electrode.

In this example, the aperture ratios of pixels 610 overlapping with the arrangement region of spacers 40 were adjusted by shifting the column-direction position of each second light-shielding section 5220 in the direction opposite to the arrangement region of the corresponding spacer 40 relative to the column-direction position of a row-direction light-shielding section 5230 adjacent to the second light-shielding section 5220 in the row direction. In the present example, further, the column-direction positions of the structures (e.g., gate electrode, TFT, contact section, and the like) superimposed on the second light-shielding section 5220 were also shifted in the direction opposite to the arrangement position of the spacer 40 relative to the column-direction positions of the structures superimposed on the row-direction light-shielding section 5230 adjacent to the second light-shielding section 5220 in the row direction, following the movement of the second light-shielding section 5220. In other words, the column-direction positions of the structures superimposed on the second light-shielding section 5220 were moved such that the structures superimposed on the second light-shielding section 5220 could be shielded from light even after the column-direction position of the second light-shielding section 5220 was shifted. Thus, in the present example, the pixel aperture ratios (particularly, aperture ratios of the pixels 610 shielded from light by the first light-shielding section 5210) were adjusted by moving the position of the second light-shielding section 5220 without changing the column-direction width of the second light-shielding section 5220. This reduced the difference between the aperture ratios of the pixels 610 shielded from light by the first light-shielding section 5210 and the aperture ratios of the other pixels, and therefore the visibility was improved and the display quality of the pixels (and the panels) was enhanced. Further, the structures superimposed on the second light-shielding section 5220 were also similarly moved, and therefore the decrease in the contrast ratio due to, for example, the appearance of the gate electrode, the contact section, and the like in the aperture section was also prevented.

Example 2

A liquid crystal panel of Embodiment 2 was manufactured (see FIGS. 1 to 6 and FIG. 11). Example 2 is different from Example 1 in that the conductive film (row-direction light-shielding sections 520) arranged in the TFT substrate in Example 1 was arranged in the counter substrate. Other than the above, the configurations of the liquid crystal panel are the same as those of Example 1. More specifically, the liquid crystal panel 1 was obtained by bonding a CF substrate 30 and a TFT substrate 10 which were manufactured by the methods described below, injecting a liquid crystal composition (liquid crystal layer 20), and then cutting the bonded substrates.

(2-1) Method for Manufacturing CF Substrate 30

A light-shielding resin film (1000 nm thick) is formed on a glass substrate 310, and then processed into a desired shape by photolithography. The light-shielding resin film serves as column-direction light-shielding sections 510 and row-direction light-shielding sections 520. Thereafter, a color filter (color filter layer 60) is formed at a desired position for every R, G, and B pixel, and spacers 40 are formed at desired positions.

(2-2) Method for Manufacturing TFT Substrate 10

The method is the same as the method of (1-2) above, except for forming a first insulating film 81 on a glass substrate 110 without forming a conductive film.

Also when the row-direction light-shielding sections 520 was arranged in the counter substrate as in the present example, the visibility was improved and the display quality of the pixels (and panels) was enhanced as in Example 1. Further, the structures superimposed on each second light-shielding section 5220 were also similarly moved, and therefore the decrease in the contrast ratio due to, for example, the appearance of the gate electrode, the contact section, and the like in the aperture section was also prevented. Hence, in the liquid crystal panel obtained in the present example, the visibility was extremely good and the decrease in the display quality was more sufficiently suppressed.

Example 3

A liquid crystal panel of Embodiment 3 was manufactured (see FIGS. 1 to 3, and FIGS. 12 and 13). Example 3 is different from Example 1 in that the liquid crystal panel of the present example has the COA structure. More specifically, a liquid crystal panel 1 was obtained by bonding a CF substrate 30 and a TFT substrate 10 which were manufactured by the methods described below to each other, injecting a liquid crystal composition (liquid crystal layer 20), and then cutting the bonded substrates.

(3-1) Method for Manufacturing Counter Substrate 30

Spacers 40 were manufactured at desired positions on a glass substrate 310.

(3-2) Method for Manufacturing TFT Substrate 10

A conductive film (tungsten film; 50 nm thick) is formed on a glass substrate 110, and then the conductive film is processed into a desired shape by photolithography. The conductive film serves as row-direction light-shielding sections 510 and column-direction light-shielding sections 520.

Next, a first insulating film 81 (laminated structure of SiO$_2$ (100 nm thick)/SiN (70 nm thick)) is formed.

Next, a semiconductor film 85 (oxide semiconductor (IGZO); 50 nm thick) is formed, and then the semiconductor film is processed into a desired shape by photolithography.

Next, a gate insulator 73 (SiO$_2$; 85 nm thick) is formed.

Next, a conductive film (laminated structure of Ti (100 nm thick)/Al (150 nm thick)/Ti (30 nm thick)) is formed, and then the conductive film is processed into a desired shape by photolithography. The conductive film serves as gate electrodes 72.

Next, a second insulating film 82 ($SiO_2$; 500 nm thick) is formed, and then the insulating film 82 present in a region to be a first contact section 76 is removed by photolithography.

Next, a conductive film (laminated structure of Ti (60 nm thick)/Al (300 nm thick)/Ti (20 nm thick)) is formed, and then the conductive film is processed into a desired shape by photolithography. The conductive film serves as source lines 74 and source electrodes 75.

Next, a third insulating film 83 ($SiO_2$; 500 nm thick) is formed, and then the insulating film 83 present in a region to be a second contact section 77 is removed by photolithography.

Next, the first transparent electrode 91 (IZO; 100 nm thick) is formed, and then the transparent electrode 91 is patterned by photolithography.

Next, a color filter material (photosensitive resin film; 1000 nm thick) is formed into a film, and then the color filter present in a region to be a third contact section 78 is removed by photolithography. This operation is carried out for each of red, green, and blue color filter materials, so that color filters of the red, green, blue colors (color filter layer 60) are formed in sections corresponding to red, green, blue pixels, respectively.

Next, a planarization film 80 (photosensitive resin film; 2000 nm thick) is formed, and then the planarization film 80 in a region to be a third contact section 78 is removed by photolithography.

Next, a second transparent electrode 92 (IZO; 100 nm thick) is formed, and then the transparent electrode 92 is patterned by photolithography. The transparent electrode 92 serves as pixel electrodes.

Next, a planarization film 80 (second planarization film) is formed, and then only the planarization film present in a region to be a contact hole (third contact section 78) later is left by photolithography.

Next, a fourth insulating film 84 (SiN; 100 nm thick) is formed.

Next, a third transparent electrode 93 (IZO; 100 nm thick) is formed, and then the transparent electrode 93 is patterned by photolithography. The transparent electrode 93 serves as a common electrode.

Even in the case of the liquid crystal panel having the COA structure as in the present example, the visibility was improved and the display quality of the pixels (and panels) was enhanced as in Example 1. Further, the structures superimposed on each second light-shielding section 5220 were also similarly moved, and therefore the decrease in the contrast ratio due to, for example, the appearance of the gate electrode, the contact section, and the like in the aperture section was also prevented.

Example 4

A liquid crystal panel of Embodiment 4 was manufactured (see FIGS. 1 to 3, and FIGS. 14 to 16). Example 4 is different from Example 1 in that the column-direction positions of the structures (e.g., gate electrode, TFT, contact section, and the like) superimposed on a second light-shielding section 5220 were not moved, and only the column-direction position of the second light-shielding section 5220 is moved in the present example.

In the present example, the pixel aperture ratios (particularly, aperture ratios of pixels 610 shielded from light by corresponding first light-shielding sections 5210) were adjusted by moving the position of the second light-shielding section 5220 without changing the column-direction width of the second light-shielding section 5220. By not moving the positions of the structures superimposed on the second light-shielding section 5220, the shape of the gate lines 71 arranged along the row direction were straight in the row direction, and therefore the processing shape stability of the gate lines 71 was enhanced. However, the forms of moving the positions of the structures superimposed on the second light-shielding section 5220 as in Examples 1 to 3 are more suitable because the light leakage can be more sufficiently suppressed.

The various aspects of the present invention described above may be combined as appropriate without departing from the gist of the present invention.

REFERENCE SIGNS LIST 1, 1H, 1L: liquid crystal panel
2: backlight
3: optical element
A: display section of liquid crystal panel
10: first substrate
20: liquid crystal layer
30: second substrate
110, 310: insulating substrate
40, 40R: spacer
50: light-shielding section
510, 510R: column-direction light-shielding section
520, 5210, 5220, 5230, 520R, 5210R, 5220R: row-direction light-shielding section
60: color filter layer
60R: red color filter
60G: green color filter
60B: blue color filter
70: gate driver
71: gate line
72: gate electrode
73: gate insulator
74: source line
75: source electrode
76, 77, 78: contact section
80: planarization film
81, 82, 83, 84: insulating film
85: semiconductor film (semiconductor section)
91, 92, 93: transparent electrode
1000: liquid crystal display device
1000X: head mounted display
600, 610, 620, a, b, c, 610R, 620R: pixel (sub-pixel)
U: eye of user (observer)

What is claimed is:

1. A liquid crystal panel with a plurality of pixels arranged in a matrix shape having a plurality of rows and a plurality of columns, the liquid crystal panel comprising:
 a first substrate;
 a second substrate facing the first substrate; and
 between the first substrate and the second substrate, a liquid crystal layer, a spacer, and a light-shielding section,
 wherein the light-shielding section includes a plurality of column-direction light-shielding sections and a plurality of row-direction light-shielding sections, the plurality of column-direction light-shielding sections arranged in a column direction and shielding parts between the plurality of pixels aligned in a row direction from light, the plurality of row-direction light-shielding sections arranged in the row direction and shielding parts between the plurality of pixels aligned in the column direction from light, the plurality of row-direction light-shielding sections includes a row-direction light-shielding section that has a first light-shielding section including an arrangement region of the spacer and a second light-shielding section adjacent to the first light-shielding section in the column direction, the plurality of row-direction light-shielding sections further includes a first pair of row-direction light-shielding sections and a second pair of row-direction light-shielding sections, the first and second pairs of row-direction light-shielding sections being also adjacent to the first light-shielding section in the column direction, the second light-shielding section is positioned between and offset from the first pair of row-direction light-shielding sections in the column direction away from the arrangement region of the spacer, the second light-shielding section and the first pair of row-direction light-shielding sections are positioned between and offset from the second pair of row-direction light-shielding sections in the column direction away from the arrangement region of the spacer, and the second light-shielding section and the first and second pairs of row-direction light-shielding sections form a convex shape, in the row direction, that curves outward with regard to the arrangement region of the spacer, such that the second light-shielding section is farther away from the arrangement region of the spacer compared to the first pair of row-direction light-shielding sections and the first pair of row-direction light-shielding sections is farther away from the arrangement region of the spacer compared to the second pair of row-direction light-shielding sections.

2. The liquid crystal panel according to claim 1, wherein the plurality of row-direction light-shielding sections is arranged in the first substrate.

3. The liquid crystal panel according to claim 1, wherein the plurality of row-direction light-shielding sections is arranged in the second substrate.

4. The liquid crystal panel according to claim 1, wherein the first light-shielding section defines a row-direction light-shielding section shielding parts between a plurality of blue pixels aligned in the column direction from light.

5. The liquid crystal panel according to claim 4, wherein the liquid crystal panel satisfies the following Expression:

$$(A/B) \times 100 \geq 85 (\%),$$

where A (%) represents an aperture ratio of a blue pixel (a) among the blue pixels aligned in the column direction, the blue pixel (a) being shielded from light by the first light-shielding section, and B (%) represents an aperture ratio of a blue pixel (b) adjacent to the blue pixel (a) in a column direction opposite the first light-shielding section.

6. A head mounted display device comprising: the liquid crystal panel according to claim 1.

7. A head mounted display device comprising: the liquid crystal panel according to claim 2.

8. A head mounted display device comprising: the liquid crystal panel according to claim 3.

9. A head mounted display device comprising: the liquid crystal panel according to claim 4.

10. A head mounted display device comprising: the liquid crystal panel according to claim 5.

11. A liquid crystal display device comprising: the liquid crystal panel according to claim 1.

12. A liquid crystal display device comprising: the liquid crystal panel according to claim 2.

13. A liquid crystal display device comprising: the liquid crystal panel according to claim 3.

14. A liquid crystal display device comprising: the liquid crystal panel according to claim 4.

15. A liquid crystal display device comprising: the liquid crystal panel according to claim 5.

16. The liquid crystal panel according to claim 1, wherein the plurality of row-direction light-shielding sections further includes a third light-shielding section, a third pair of row-direction light-shielding sections, and a fourth pair of row-direction light-shielding sections, the third light-shielding section and the third and fourth pairs of row-direction light-shielding sections are adjacent to the first light-shielding section in the column direction and on a side of the first light-shielding section opposite the second light-shielding section, the third light-shielding section is positioned between and offset from the third pair of row-direction light-shielding sections in the column direction away from the arrangement region of the spacer, the third light-shielding section and the third pair of row-direction light-shielding sections are positioned between and offset from the fourth pair of row-direction light-shielding sections in the column direction away from the arrangement region of the spacer, and the third light-shielding section and the third and fourth pairs of row-direction light-shielding sections form a convex shape, in the row direction, that curves outward with regard to the arrangement region of the spacer, such that the third light-shielding section is farther away from the arrangement region of the spacer compared to the third pair of row-direction light-shielding sections and the third pair of row-direction light-shielding sections is farther away from the arrangement region of the spacer compared to the fourth pair of row-direction light-shielding sections.

* * * * *